(12) United States Patent
Han et al.

(10) Patent No.: US 9,344,921 B2
(45) Date of Patent: May 17, 2016

(54) APPARATUS AND METHOD FOR SUPPORTING COMMUNICATION NETWORK IN PORTABLE TERMINAL

(71) Applicant: Samsung Electronics Co. Ltd., Suwon-si, Gyeonggi-do (KR)

(72) Inventors: Yong-Gil Han, Gumi-si (KR); Seung-Ho Yang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 14/077,875

(22) Filed: Nov. 12, 2013

(65) Prior Publication Data

US 2014/0133457 A1 May 15, 2014

(30) Foreign Application Priority Data

Nov. 13, 2012 (KR) ........................ 10-2012-0128195

(51) Int. Cl.
| | | |
|---|---|---|
| *H04W 36/00* | (2009.01) | |
| *H04W 60/00* | (2009.01) | |
| *H04W 36/14* | (2009.01) | |
| *H04W 36/30* | (2009.01) | |

(52) U.S. Cl.
CPC ........ *H04W 36/0022* (2013.01); *H04W 60/005* (2013.01); *H04W 36/14* (2013.01); *H04W 36/30* (2013.01)

(58) Field of Classification Search
CPC ................................................ H04W 36/0022
USPC ........................... 370/310, 328, 331, 352, 389
See application file for complete search history.

(56) References Cited

U.S. PATENT DOCUMENTS

| | | | | |
|---|---|---|---|---|
| 2003/0220102 A1* | 11/2003 | Kallio | ................... | H04W 36/12 455/422.1 |
| 2004/0248616 A1* | 12/2004 | Pecen | ................... | H04W 68/00 455/552.1 |
| 2005/0118946 A1* | 6/2005 | Colban | ............... | H04L 12/1881 455/3.06 |
| 2005/0124299 A1* | 6/2005 | Scribano | ............... | H04W 28/18 455/68 |
| 2006/0291416 A1* | 12/2006 | Rexhepi | ................. | H04W 36/12 370/331 |
| 2008/0039086 A1* | 2/2008 | Gallagher | ............... | H04W 8/04 455/435.1 |
| 2008/0039087 A1* | 2/2008 | Gallagher | ............... | H04W 8/04 455/435.2 |
| 2008/0064389 A1* | 3/2008 | Salkintzis | ........... | H04W 76/027 455/425 |
| 2009/0103455 A1* | 4/2009 | Balasubramanian | ... | H04W 8/06 370/254 |
| 2009/0170516 A1* | 7/2009 | Ostrup | ................... | H04W 48/10 455/436 |
| 2010/0041405 A1* | 2/2010 | Gallagher | ............... | H04W 8/02 455/436 |
| 2010/0195643 A1 | 8/2010 | Kodali et al. | | |
| 2010/0296421 A1 | 11/2010 | Watfa et al. | | |
| 2010/0297979 A1 | 11/2010 | Watfa et al. | | |
| 2011/0149908 A1* | 6/2011 | Olsson | ............... | H04W 36/0022 370/331 |
| 2011/0194505 A1 | 8/2011 | Faccin et al. | | |
| 2011/0249624 A1 | 10/2011 | Ramachandran et al. | | |
| 2012/0011257 A1* | 1/2012 | Kim | ..................... | H04L 65/1016 709/227 |
| 2012/0028661 A1* | 2/2012 | Fang | ................. | H04W 36/0022 455/466 |
| 2012/0069731 A1* | 3/2012 | Tooher | ................ | H04W 76/026 370/221 |

(Continued)

*Primary Examiner* — Andrew Lai
*Assistant Examiner* — Andrew C Lee
(74) *Attorney, Agent, or Firm* — Jefferson IP Law, LLP (57) ABSTRACT

An apparatus and a method for supporting a communication network in a portable terminal are provided. The method includes receiving a registration confirmation message from a first base station, determining whether the first base station satisfies a switching condition to a packet switching mode, switching a mode of the portable terminal from a circuit switching mode to the packet switching mode when the first base station satisfies the switching, and registering the portable terminal in a first communication network through the first base station in the packet switching mode.

21 Claims, 4 Drawing Sheets

(56) References Cited

U.S. PATENT DOCUMENTS

| | | | |
|---|---|---|---|
| 2012/0120789 A1* | 5/2012 | Ramachandran | H04W 36/0022 370/220 |
| 2012/0176908 A1* | 7/2012 | Lee | H04L 1/188 370/241 |
| 2012/0201226 A1* | 8/2012 | Sambhwani | H04B 7/022 370/332 |
| 2012/0250659 A1* | 10/2012 | Sambhwani | H04W 74/002 370/332 |
| 2012/0269173 A1* | 10/2012 | Chin | H04W 68/12 370/332 |
| 2013/0044613 A1* | 2/2013 | Edara | H04W 76/026 370/252 |
| 2013/0094446 A1* | 4/2013 | Swaminathan | H04W 36/0022 370/328 |

\* cited by examiner

APPARATUS AND METHOD FOR SUPPORTING COMMUNICATION NETWORK IN PORTABLE TERMINAL

PRIORITY

This application claims the benefit under 35 U.S.C. §119 (a) of a Korean patent application filed on Nov. 13, 2012 in the Korean Intellectual Property Office and assigned Serial No. 10-2012-0128195, the entire disclosure of which is hereby incorporated by reference.

BACKGROUND OF THE INVENTION

1. Field of the Invention

The present invention relates to a portable terminal. More particularly, the present invention relates to an apparatus and a method for supporting a communication network in a portable terminal

2. Description of the Related Art

With the rapid development of technologies related to portable terminals, smart phones (e.g., which may be considered a type of portable terminal,) have emerged. Such smart phones provide functions similar to a Personal Computer (PC) and high level functions. For example, smart phones may perform functions associated with electronic mail, Internet access, an electronic book reading, various applications, and the like. Particularly, portable terminals may connect to communication systems (e.g., 2nd generation to 4th generation communication systems) to receive a data service.

Meanwhile, portable terminals, which provide a voice service through a circuit switching mode while providing a packet service through a packet switching mode, may not connect to the 4th generation communication system when a base station including the portable terminals satisfies a specific condition. For example, the specific condition includes conditions in which the base station provides a circuit switching mode not supporting Circuit Switched Fallback (CSFB), provides the circuit switching mode supporting only a short message, or provides only an Evolved Packet System (EPS) service.

As described above, in the case in which a connection to the 4th generation communication system is interrupted, even when a connection to the 4th generation communication system is requested by a user, the portable terminals cannot attempt to access the 4th generation communication system before the portable terminals are rebooted. As a result, the portable terminals may lose an opportunity to access the 4th generation communication system, in spite of a user request.

Therefore, a need exists for an apparatus and a method by which a portable terminal is able to connect to a 4th generation communication system through a packet switching mode.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method by which a portable terminal is able to connect to a 4th generation communication system through a packet switching mode.

Another aspect of the present invention is to provide an apparatus and a method by which a portable terminal is able to connect to a 4th generation communication system through a packet switching mode even though a base station including the portable terminal corresponds to a specific condition.

In accordance with an aspect of the present invention, an apparatus for supporting a communication network in a portable terminal is provided. The apparatus includes a wireless transmission/reception unit, and a control unit for receiving a registration confirmation message from a first base station, for determining whether the first base station satisfies a switching condition to a packet switching mode, for switching a mode of the portable terminal from a circuit switching mode to the packet switching mode when the first base station satisfies the switching condition, and for registering the portable terminal in a first communication network through the first base station in the packet switching mode.

In accordance with another aspect of the present invention, a method for supporting a communication network in a portable terminal is provided. The method includes receiving a registration confirmation message from a first base station, determining whether the first base station satisfies a switching condition to a packet switching mode, switching a mode of the portable terminal from a circuit switching mode to the packet switching mode when the first base station satisfies the switching condition, and registering the portable terminal in a first communication network through the first base station in the packet switching mode.

The present invention provides an effect in which a portable terminal is able to connect to a 4th generation communication system through a packet switching mode.

Furthermore, the present invention provides an effect in which a portable terminal is able to connect to a 4th generation communication system through a packet switching mode even though a base station including the portable terminal corresponds to a specific condition.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, a portable terminal may correspond to a portable and movable electronic device, and may include a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (a notebook, a tablet, and the like), a digital camera, and the like.

Figure 1:
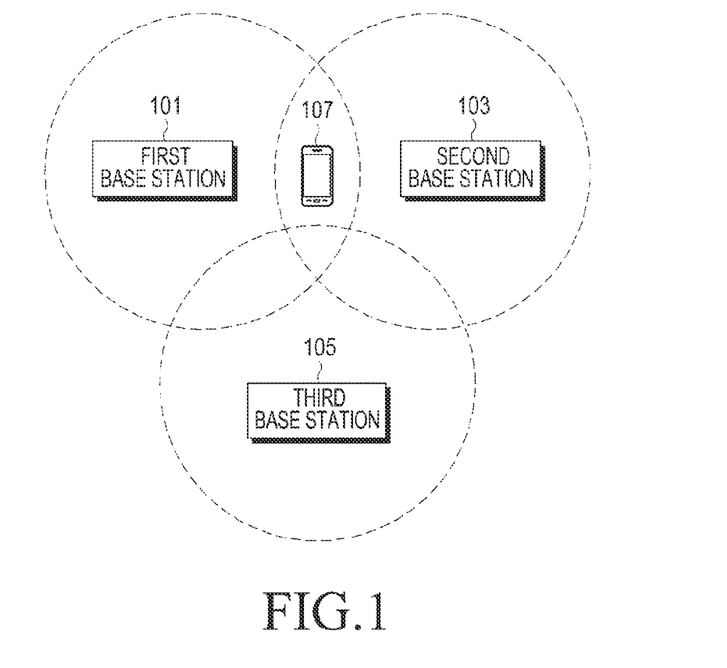
FIG. 1 illustrates a communication system according to an exemplary embodiment of the present invention.

FIG. 1 illustrates a communication system according to an exemplary embodiment of the present invention.

Referring to FIG. 1, the communication system includes a first base station 101, a second base station 103, a third base station 105, and a portable terminal 107.

The first base station 101 and the third base station 105 support a first communication scheme, and provide the portable terminal 107 with a service (e.g., a voice or data service) according to the first communication scheme. The first communication scheme may include a communication scheme according to a 4th generation communication system. The 4th generation communication system may include a Long Term Evolution (LTE) communication system (e.g., network).

The first base station 101 and the third base station 105 periodically broadcast a first communication registration confirmation message in cell areas thereof. The first base station 101 and the third base station 105 register the portable terminal 107 in a first communication network supporting the first communication scheme according to a request of the portable terminal 107.

The first communication registration confirmation message includes information necessary for registering the portable terminal 107 in the first communication network. As an example, the first communication registration confirmation message may include support information on a service supported by a base station. The service support information includes information indicating whether the base station provides a Circuit Switching (CS) mode not supporting a Circuit Switched Fallback (CSFB) mode, whether the base station provides a CS mode supporting only a Short Message Service (SMS), or the base station provides only an Evolved Packet System (EPS) service.

The CS corresponds to a voice transmission scheme for supporting voice communication, and a scheme for providing a physical path (circuit) for a connection time for a single connection between a transmitter and a receiver. The CSFB corresponds to a scheme for supporting voice communication in the LTE. In more detail, the CSFB indicates a scheme in which, when voice communication is requested or received during a connection of the portable terminal 107 to the LTE, the portable terminal 107 releases the connection to the LTE, and connects to a 2nd generation or 3rd generation communication system to provide voice communication through the 2nd generation or 3rd generation network.

The EPS is a system installed for an LTE service, and is defined by a combination of a wireless part (a connection system) and an Evolved Packet Core (EPC) that is an IP-based core network. The EPC indicates a packet-based all IP mobile core network for the LTE.

The second base station 103 supports a second communication scheme, and provides the portable terminal 107 with a service (e.g., a voice or data service) according to the second communication scheme. The second base station 103 registers the portable terminal 107 in a second communication network supporting the second communication scheme according to a request of the portable terminal 107.

The second communication scheme may include a communication scheme according to the 2nd generation or 3rd generation communication system. The 2nd generation communication system may include Global System for Mobile Telecommunication (GSM), and the 3rd generation communication system may include a Universal Mobile Telecommunication System (UMTS).

The portable terminal 107 supports both the first communication scheme and the second communication scheme, and is registered in the first communication network or the second communication network. In more detail, the portable terminal 107 supports both the CS mode and a Packet Switching (PS) mode, and is registered in the first communication network through the first base station 101 and the third base station 105 while being registered in the second communication network through the second base station 103.

The PS mode corresponds to a data transmission scheme for supporting data communication, and a scheme for transmitting data through a packet of a small block and using a network resource only during the transmission of data.

The portable terminal 107 attempts registration in the first communication network through the first base station 101, receives the first communication registration confirmation message from the first base station 101, and analyzes the service support information included in the received first communication registration confirmation message. As a result of the analysis of the service support information included in the received first communication registration confirmation message, the portable terminal 107 confirms whether the first base station 101 provides the CS mode not supporting the CSFB, whether the first base station 101 provides the CS mode supporting only the SMS, or whether the first base station 101 provides only the EPS service.

As a result of the confirmation, if the first base station 101 does not satisfy conditions when the portable terminal 107 confirms whether the first base station 101 provides the CS mode not supporting the CSFB, the first base station 101 provides the CS mode supporting only the SMS, or the first base station 101 provides only the EPS service (e.g., if the first base station 101 does not provide the CS mode not supporting the CSFB, if the first base station 101 does not provide the CS mode supporting only the SMS, or if the first base station 101 does not provide only the EPS service), then the portable terminal 107 is registered in the first communication network through the first base station 101 in the CS mode.

When the first base station 101 provides the CS mode not supporting the CSFB mode, when the first base station 101 provides the CS mode supporting only the SMS, or when the first base station 101 provides only the EPS service, the portable terminal 107 inquires whether the user wishes to switch from the CS mode to the PS mode.

When the user does not request to switch to the PS mode, the portable terminal 107 attempts registration in the second communication network through the second base station 103. In contrast, if the user requests to switch to the PS mode, the portable terminal 107 switches the mode of the portable terminal 107 from the CS mode to the PS mode. Thereafter, the portable terminal 107 is registered in the first communication network through the first base station 101 in the PS mode.

When the portable terminal 107 moves to the third base station 105 during the registration in the first communication network in the PS mode, the portable terminal 107 attempts registration in the first communication network through the third base station 105. Thereafter, the portable terminal 107 receives the first communication registration confirmation message from the third base station 105, and analyzes the service support information included in the received first communication registration confirmation message.

As a result of the analysis of the service support information included in the received first communication registration confirmation message, the portable terminal 107 confirms whether the third base station 105 provides the CS mode not supporting the CSFB, whether the third base station 105 provides the CS mode supporting only the SMS, or whether the third base station 105 provides only the EPS service.

As a result of the confirmation, if the third base station satisfies conditions when the portable terminal 107 confirms whether the third base station 105 provides the CS mode not supporting the CSFB, whether the third base station 105 provides the CS mode supporting only the SMS, or whether the third base station 105 provides only the EPS service (e.g., if the third base station 105 provides the CS mode not supporting the CSFB, if the third base station 105 provides the CS mode supporting only the SMS, or if the third base station 105 provides only the EPS service), then the portable terminal 107 is registered in the first communication network through the third base station 105 in the PS mode.

When the third base station 105 does not satisfy the conditions when the portable terminal 107 confirms whether the third base station 105 provides the CS mode not supporting the CSFB, the third base station 105 provides the CS mode supporting only the SMS, or the third base station 105 provides only the EPS service (e.g., if the third base station 105 does not provide the CS mode not supporting the CSFB, if the third base station 105 does not provide the CS mode supporting only the SMS, or if the third base station 105 does not provide only the EPS service), then the portable terminal 107 switches the phone mode of the portable terminal 107 from the PS mode to the CS mode and is registered in the first communication network through the third base station 105 in the CS mode.

Figure 2:
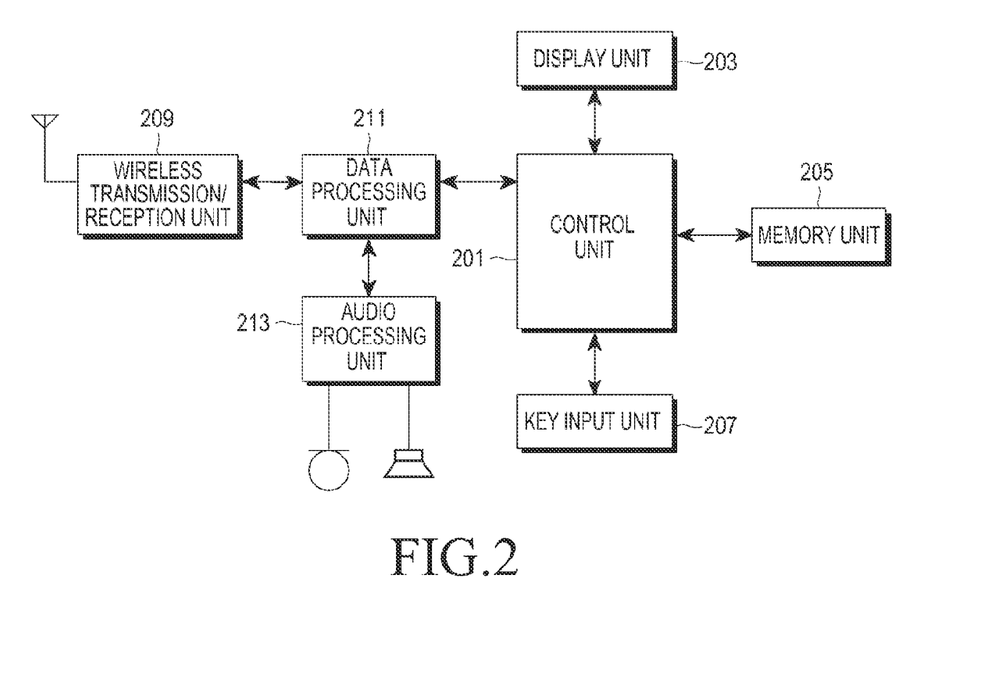
FIG. 2 illustrates a block configuration of a portable terminal according to an exemplary embodiment of the present invention.

FIG. 2 illustrates a block configuration of a portable terminal according to an exemplary embodiment of the present invention.

Referring to FIG. 2, the portable terminal 107 includes a control unit 201, a display unit 203, a memory unit 205, a key input unit 207, a wireless transmission/reception unit 209, a data processing unit 211, and an audio processing unit 213.

The wireless transmission/reception unit 209 performs a wireless communication function of the portable terminal In more detail, the wireless transmission/reception unit 209 includes a wireless transmitter for up-converting and amplifying a frequency of a transmitted signal, a wireless receiver for low-noise amplifying a received signal and down-converting a frequency of the received signal, and the like. The data processing unit 211 includes a transmitter for coding and modulating the transmitted signal, a receiver for demodulating and decoding the received signal, and the like. The data processing unit 211 may be configured by a modem, a codec, and the like. The codec may include a data codec for processing packet data and the like, and an audio codec for processing an audio signal such as voice, and the like.

The audio processing unit 213 performs functions of reproducing a reception audio signal, which is output from the data processing unit 211, through a speaker, and transmitting a transmission audio signal generated from a microphone to the data processing unit 211.

The key input unit 207 includes keys for inputting numeral and character information and function keys for setting various functions.

The display unit 203 displays a video signal on a screen and displays data requested to be output by the control unit 201.

When the display unit 203 is provided with a capacitive or resistive touch display screen, the key input unit 207 may include only a minimum number of keys set in advance, and the display unit 203 may substitute for a part of the key input function of the key input unit 207.

The memory unit 205 includes a program memory and a data memory. The program memory stores information or data associated with booting and an Operating System (OS) for controlling a general operation of the portable terminal The data memory stores various types of data generated during the operation of the portable terminal The control unit 201 performs a function of controlling an overall operation of the portable terminal. Particularly, when the portable terminal may not be registered in the first communication network in the CS mode, the control unit 201 provides a method by which the portable terminal can register in the first communication network in the PS mode.

In more detail, the control unit 201 attempts registration in the first communication network through the first base station 101, receives the first communication registration confirmation message from the first base station 101, and analyzes the service support information included in the received first communication registration confirmation message. The first communication network indicates a network that performs communication according to the first communication scheme. The first communication scheme may include a communication scheme according to the 4th generation communication system. As an example, the 4th generation communication system may include Long Term Evolution (LTE).

The first communication registration confirmation message includes information necessary for registering the portable terminal in the first communication network. As an example the first communication registration confirmation message may include support information on a service supported by a base station. The service support information includes information indicating whether the base station provides the CS mode not supporting the CSFB, whether the base station provides the CS mode supporting only the SMS, or whether the base station provides only the EPS service.

Based on a result of the analysis of the service support information included in the received first communication registration confirmation message, the control unit 201 confirms whether the first base station 101 provides the CS mode not supporting the CSFB, whether the first base station 101 provides the CS mode supporting only the SMS, or whether the first base station 101 provides only the EPS service.

As a result of the confirmation, when the first base station 101 does not satisfy conditions in which the control unit 201 confirms whether the first base station 101 provides the CS mode not supporting the CSFB, whether the first base station 101 provides the CS mode supporting only the SMS, or whether the first base station 101 provides only the EPS service (e.g., if the first base station 101 does not provide the CS mode not supporting the CSFB, if the first base station 101 does not provide the CS mode supporting only the SMS, or if the first base station 101 provides only the EPS service), then the control unit 201 registers the portable terminal 107 in the first communication network through the first base station 101 in the CS mode. The above conditions are referred to as PS mode switching conditions.

When the first base station 101 provides the CS mode not supporting the CSFB, when the first base station 101 provides the CS mode supporting only the SMS, or when the first base station 101 provides only the EPS service, the control unit 201 inquires whether the user wishes to switch from the CS mode to the PS mode. For example, the control unit 201 outputs a pop-up window including a prompt "Switch to PS mode?" through the display unit 203, thereby inquiring of a user about whether to switch from the CS mode to the PS mode.

When the user does not request to switch to the PS mode, the control unit 201 attempts registration in the second communication network through the second base station 103. The second communication network indicates a network that performs communication according to the second communication scheme. The second communication scheme may include a communication scheme according to the 2nd generation or 3rd generation communication system. The 2nd generation communication system may include Global System for Mobile Telecommunication (GSM) and the 3rd generation communication system may include a Universal Mobile Telecommunication System (UMTS).

In contrast, when the user requests to switch to the PS mode, the control unit 201 switches the mode of the portable terminal 107 from the CS mode to the PS mode. Then, the control unit 201 registers the portable terminal 107 in the first communication network through the first base station 101 in the PS mode.

When the portable terminal 107 moves to the third base station 105 during the registration in the first communication network in the PS mode, the control unit 201 attempts registration in the first communication network through the third base station 105. Thereafter, the control unit 201 receives the first communication registration confirmation message from the third base station 105, and analyzes the service support information included in the received first communication registration confirmation message.

Based on a result of the analysis of the service support information included in the received first communication registration confirmation message, the control unit 201 confirms whether the third base station 105 provides the CS mode not supporting the CSFB, whether the third base station 105 provides the CS mode supporting only the SMS, or whether the third base station 105 provides only the EPS service.

As a result of the confirmation, if the third base station satisfies conditions when the control unit 201 confirms whether the third base station 105 provides the CS mode not supporting the CSFB, whether the third base station 105 provides the CS mode supporting only the SMS, or whether the third base station 105 provides only the EPS service (e.g., if the third base station 105 provides the CS mode not supporting the CSFB, if the third base station 105 provides the CS mode supporting only the SMS, or if the third base station 105 provides only the EPS service), then the control unit 201 registers the portable terminal 107 in the first communication network through the third base station 105 in the PS mode.

When the third base station 105 does not satisfy conditions in which the control unit 201 confirms whether the third base station 105 provides the CS mode not supporting the CSFB, whether the third base station 105 provides the CS mode supporting only the SMS, or whether the third base station 105 provides only the EPS service (e.g., if the third base station 105 does not provide the CS mode not supporting the CSFB, if the third base station 105 does not provide the CS mode supporting only the SMS, or if the third base station 105 provides only the EPS service), then the control unit 201 switches the phone mode of the portable terminal 107 from the PS mode to the CS mode, and registers the portable terminal 107 in the first communication network through the third base station 105 in the CS mode.

Figure 3:
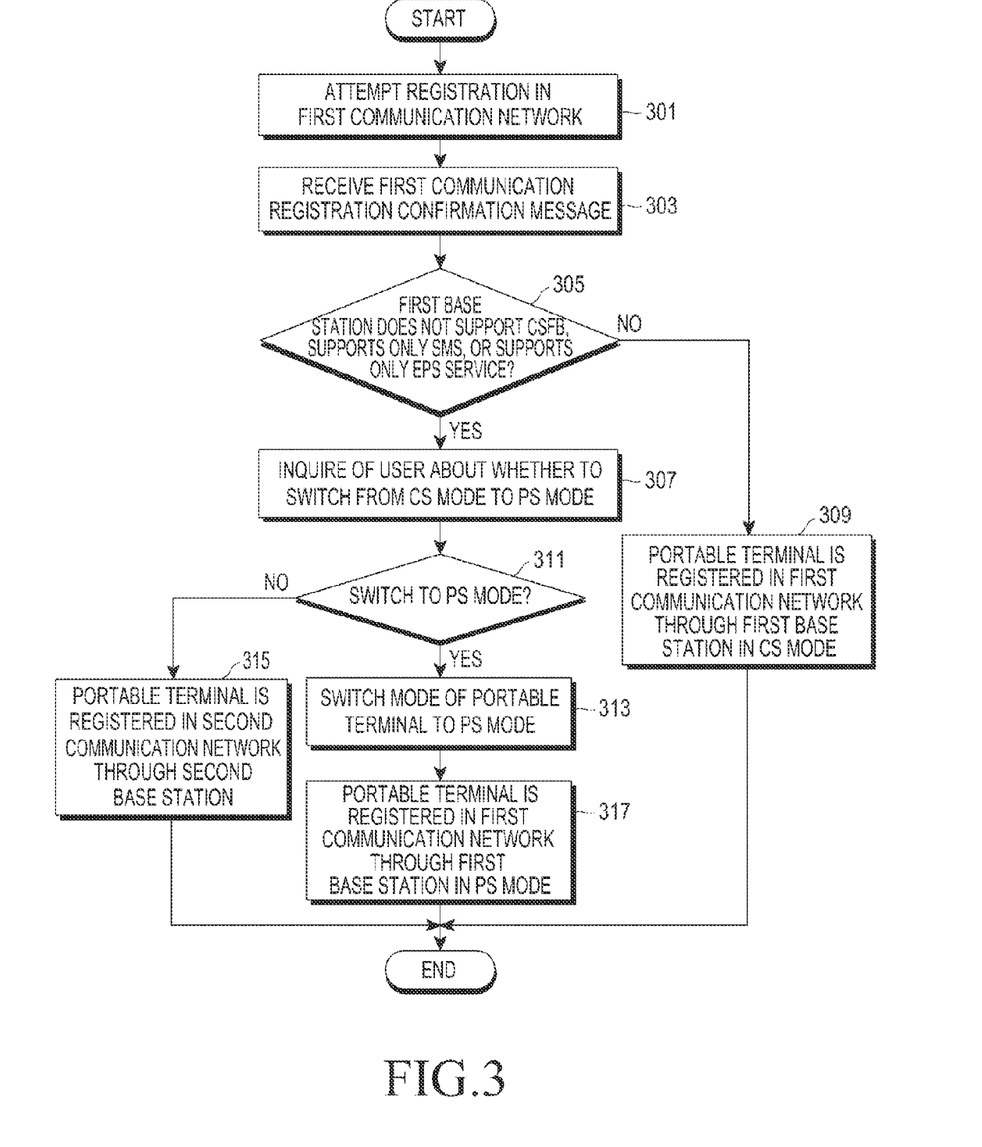
FIG. 3 illustrates a procedure by which a portable terminal according to a first exemplary embodiment of the present invention supports a communication network.

FIG. 3 illustrates a procedure by which the portable terminal according to a first exemplary embodiment of the present invention supports the communication network.

Referring to FIG. 3, a description will be provided for a method for switching the phone mode of the portable terminal 107 from the CS mode to the PS mode and for then registering the portable terminal 107 in the first communication network.

In step S301, the control unit 201 attempts registration in the first communication network through the first base station 101, and proceeds to step S303.

In step S303, the control unit 201 receives the first communication registration confirmation message from the first base station 101, and proceeds to step S305.

The first communication network corresponds to a network that performs communication according to the first communication scheme. The first communication scheme may include a communication scheme according to the 4th generation communication system. The 4th generation communication system may include Long Term Evolution (LTE). The first communication registration confirmation message includes information necessary for registering the portable terminal in the first communication network. As an example, the first communication registration confirmation message includes support information on a service supported by a base station. The service support information includes information indicating whether the base station provides the CS mode not supporting the CSFB, whether the base station provides the CS mode supporting only the SMS, or whether the base station provides only the EPS service.

In step S305, the control unit 201 analyzes the service support information included in the received first communication registration confirmation message, thereby confirming whether the first base station 101 provides the CS mode not supporting the CSFB, whether the first base station 101 provides the CS mode supporting only the SMS, or whether the first base station 101 provides only the EPS service. For example, in step S305, the control unit 201 determines whether the first base station 101 provides the CS mode not supporting the CSFB, the first base station 101 provides the CS mode supporting only the SMS, or the first base station 101 provides only the EPS service according to the service support information included in the received first communication registration confirmation message.

As a result of the confirmation, if the first base station 101 satisfies conditions in which the control unit 201 confirms whether the first base station 101 provides the CS mode not supporting the CSFB, whether the first base station 101 provides the CS mode supporting only the SMS, or whether the first base station 101 provides only the EPS service, then the control unit 201 proceeds to step S307. Otherwise, the control unit 201 proceeds to step S309. The above conditions are referred to as the PS mode switching conditions.

In step S309, the control unit 201 registers the portable terminal 107 in the first communication network through the first base station 101 in the CS mode. Thereafter, the control unit 201 may end the procedure.

In step S307, the control unit 201 inquires whether a user wishes to switch from the CS mode to the PS mode, and then proceeds to step S311. For example, the control unit 201 may output a pop-up window including a prompt "Switch to PS mode?" through the display unit 203, thereby inquiring of a user about whether to switch from the CS mode to the PS mode.

In step S311, when the user requests to switch to the PS mode, the control unit 201 proceeds to step S313. Otherwise, when the user does not request to switch to the PS mode, the control unit 201 proceeds to step S315.

In step S315, the control unit 201 attempts registration in the second communication network through the second base station 103. Thereafter, the control unit 201 may end the procedure.

The second communication network corresponds to a network that performs communication according to the second communication scheme. The second communication scheme may include a communication scheme according to the 2nd generation or 3rd generation communication system. The 2nd generation communication system may include Global System for Mobile Telecommunication (GSM) and the 3rd generation communication system may include a Universal Mobile Telecommunication System (UMTS).

In step S313, the control unit 201 switches the mode of the portable terminal 107 from the CS mode to the PS mode, and proceeds to step S317.

In step S317, the control unit 201 registers the portable terminal 107 in the first communication network through the first base station 101 in the PS mode. Thereafter, the control unit 201 may end the procedure.

Figure 4:
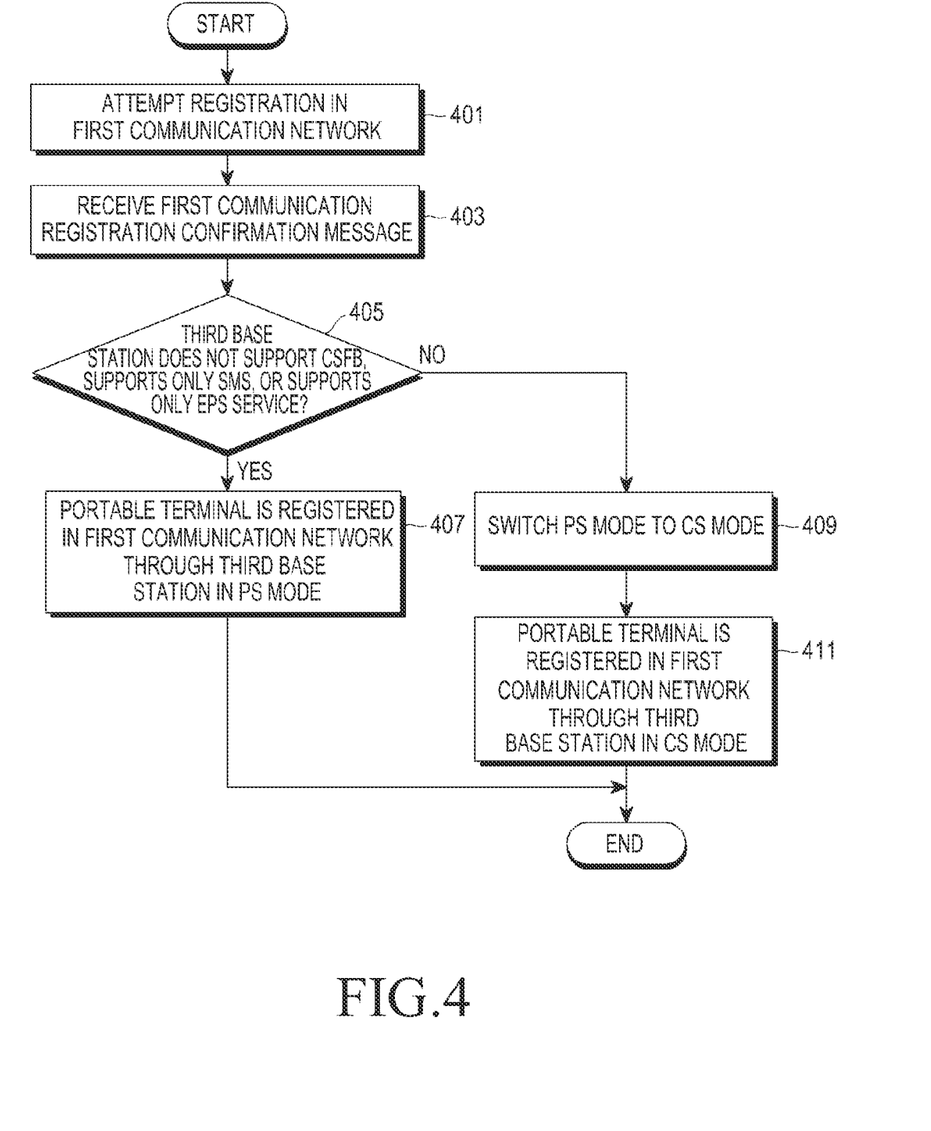
FIG. 4 illustrates a procedure by which a portable terminal according to a second exemplary embodiment of the present invention supports a communication network.

FIG. 4 illustrates a procedure by which the portable terminal according to a second exemplary embodiment of the present invention supports the communication network.

Referring to FIG. 4, a description will be provided for a method for switching the phone mode of the portable terminal 107 from the PS mode to the CS mode and for then registering the portable terminal 107 in the first communication network.

Referring to FIG. 4, in step 401, when the portable terminal 107 moves to the third base station 105 during the registration in the first communication network in the PS mode, the control unit 201 attempts registration in the first communication network through the third base station 105, and thereafter proceeds to step S403.

In step S403, the control unit 201 receives the first communication registration confirmation message from the third base station 105, and thereafter proceeds to step S405.

The first communication network corresponds to a network that performs communication according to the first communication scheme. The first communication scheme may include a communication scheme according to the 4th generation communication system. The 4th generation communication system may include LTE. The first communication registration confirmation message includes information necessary for registering the portable terminal in the first communication network, and for example, includes support information on a service supported by a base station. The service support information includes information indicating whether the base station provides the CS mode not supporting the CSFB, whether the base station provides the CS mode supporting only the SMS, or whether the base station provides only the EPS service.

In step S403, the control unit 201 analyzes the service support information included in the received first communication registration confirmation message, thereby confirming whether the third base station 105 provides the CS mode not supporting the CSFB, whether the third base station 105 provides the CS mode supporting only the SMS, or whether the third base station 105 provides only the EPS service. For example, the control unit 201 determines whether the third base station 105 provides the CS mode not supporting the CSFB, the third base station 105 provides the CS mode supporting only the SMS, or the third base station 105 provides only the EPS service according to the service support information included in the received first communication registration confirmation message.

As a result of the confirmation, if the third base station satisfies conditions in which the portable terminal 107 confirms whether the third base station 105 provides the CS mode not supporting the CSFB, whether the third base station 105 provides the CS mode supporting only the SMS, or whether the third base station 105 provides only the EPS service, then the control unit 201 proceeds to step S407. Otherwise, the control unit 201 proceeds to step S409.

In step S407, the control unit 201 registers the portable terminal 107 in the first communication network through the third base station 105 in the PS mode. Thereafter, the control unit 201 may end the procedure.

In step S409, the control unit 201 switches the phone mode of the portable terminal 107 from the PS mode to the CS mode, and thereafter proceeds to step S411.

In step S411, the control unit 201 registers the portable terminal 107 in the first communication network through the third base station 105 in the CS mode. Thereafter, the control unit 201 may end the procedure.

Figure 5:
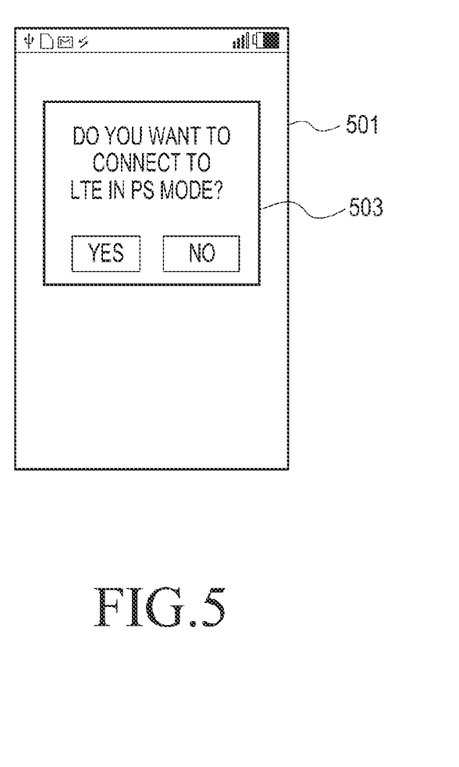
FIG. 5 illustrates a screen displaying a pop-up window for inquiring the switching of a Packet Switching (PS) mode in a portable terminal according to an exemplary embodiment of the present invention.

FIG. 5 illustrates a screen displaying a pop-up window for inquiring the switching of the PS mode in the portable terminal according to an exemplary embodiment of the present invention.

Referring to FIG. 5, if a specific base station satisfies conditions in which the specific base station provides the CS mode not supporting the CSFB, the specific base station provides the CS mode supporting only the SMS, or the specific base station provides only the EPS service, the control unit 201 may display a pop-up window 503 including a prompt "Do you want to connect to LTE in PS mode?" and terms "Yes" and "No" for checking the intention of a user, as illustrated in a screen 501.

Through the above configuration and operations, exemplary embodiments of the present invention provide an effect in which the portable terminal is able to connect to the 4th generation communication system through the packet switching mode. Furthermore, exemplary embodiments of the present invention provide an effect in which the portable terminal is able to connect to the 4th generation communication system through the packet switching mode even though a base station including the portable terminal corresponds to a specific condition.

The apparatus and the method for supporting the communication network in the portable terminal according to exemplary embodiments of the present invention may be achieved in a non-transient computer-readable recording medium as computer-readable codes. The non-transient computer-readable recording medium includes all kinds of recording devices for storing data readable by a computer system. The non-transient computer-readable recording medium, for example, includes ROM, RAM, an optical disk, a magnet tape, a floppy disk, a hard disk, a nonvolatile memory and the like. Furthermore, the non-transient computer-readable recording medium may be distributed to computer systems connected to one another through a network, and computer-readable codes may be stored and executed in a distribution scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal in a communication network, the portable terminal comprising:
 a wireless transceiver; and
 controller configured to:
  receive a registration confirmation message from a first base station, the registration confirmation message including support information on a service supported by the first base station,
  determine whether the first base station can switch to a packet switching mode based on a switching condition in the registration confirmation message,
  switch from a circuit switching mode to the packet switching mode when the first base station can switch to the packet switching mode, and
  register the portable terminal in a first communication network through the first base station in the packet switching mode.

2. The portable terminal of claim 1, wherein the switching condition includes at least one of a condition in which the first base station provides the circuit switching mode not supporting Circuit Switched Fallback (CSFB), a condition in which the first base station provides the circuit switching mode supporting only a short message service, and a condition in which the first base station provides only an Evolved Packet System (EPS) service.

3. The portable terminal of claim 1, wherein the first communication network includes a network for providing a 4th generation communication system.

4. The portable terminal of claim 1, wherein, when the first base station cannot switch to the packet switching mode, the controller is further configured to register the portable terminal in the first communication network through the first base station in the circuit switching mode.

5. The portable terminal of claim 1, wherein the controller is further configured to:
 output a message inquiring whether a user wishes to switch the portable terminal from the circuit switching mode to the packet switching mode, and
 switch from the circuit switching mode to the packet switching mode when the user requests to switch the portable terminal to the packet switching mode.

6. The portable terminal of claim 5, wherein, when the switching to the packet switching mode is rejected by the user, the controller is further configured to register the portable terminal in a second communication network through a second base station.

7. The portable terminal of claim 6, wherein the second communication network includes a network for providing one of a 2nd generation communication system and a 3rd generation communication system.

8. The portable terminal of claim 1, wherein, when the portable terminal moves to a third base station during registration in the first communication network in the packet switching mode, the controller is further configured to:
 receive a registration confirmation message from the third base station,
 determine whether the third base station can switch to the packet switching mode, and
 register the portable terminal in the first communication network through the third base station in the packet switching mode when the third base station can switch to the packet switching mode.

9. The portable terminal of claim 8, wherein, when the third base station cannot switch to the packet switching mode, the controller is further configured to:
 switch from the packet switching mode to the circuit switching mode, and
 register the portable terminal in the first communication network through the third base station in the circuit switching mode.

10. The portable terminal of claim 1, wherein the controller is further configured to determine whether the third base station can switch to the packet switching mode based on the registration confirmation message from the third base station.

11. A method for supporting a communication network in a portable terminal, the method comprising:
 receiving a registration confirmation message from a first base station, the registration confirmation message including support information on a service supported by the first base station;
 determining whether the first base station can switch to a packet switching mode based on a switching condition in the registration confirmation message;
 switching the portable terminal from a circuit switching mode to the packet switching mode when the first base station can switch to the packet switching mode; and
 registering the portable terminal in a first communication network through the first base station in the packet switching mode.

12. The method of claim 11, wherein the switching condition includes at least one of a condition in which the first base station provides the circuit switching mode not supporting Circuit Switched Fallback (CSFB), a condition in which the first base station provides the circuit switching mode supporting only a short message service, and a condition in which the first base station provides only an Evolved Packet System (EPS) service.

13. The method of claim 11, wherein the first communication network includes a network for providing a 4th generation communication system.

14. The method of claim 11, further comprising:
 registering the portable terminal in the first communication network through the first base station in the circuit switching mode when the first base station cannot switch to the packet switching mode.

15. The method of claim 11, wherein the switching to the packet switching mode comprises:

outputting a message inquiring whether a user wishes to switch the portable terminal from the circuit switching mode to the packet switching mode; and switching the portable terminal from the circuit switching mode to the packet switching mode when the user requests to switch the portable terminal to the packet switching mode.

16. The method of claim 15, further comprising:

registering the portable terminal in a second communication network through a second base station when the switching to the packet switching mode is rejected by the user.

17. The method of claim 16, wherein the second communication network includes a network for providing one of a 2nd generation communication system and a 3rd generation communication system.

18. The method of claim 11, further comprising:

receiving a registration confirmation message from a third base station when the portable terminal moves to the third base station during registration in the first communication network in the packet switching mode;

determining whether the third base station can switch to the packet switching mode; and registering the portable terminal in the first communication network through the third base station in the packet switching mode when the third base station can switch to the packet switching mode.

19. The method of claim 18, further comprising:

switching the portable terminal from the packet switching mode to the circuit switching mode when the third base station cannot switch to the packet switching mode; and registering the portable terminal in the first communication network through the third base station in the circuit switching mode.

20. The method of claim 11, wherein the determining of whether the third base station can switch to the packet switching mode comprises determining if the third base station can support the packet switching mode based on the registration confirmation message.

21. A non-transient computer-readable storage medium storing instructions, that when executed, cause at least one processor to:

receive a registration confirmation message from the third base station, the registration confirmation message including support information on a service supported by the first base station, determine whether the third base station can support a packet switching mode based on the registration confirmation message, and when the first base station supports the packet switching mode, register the portable terminal in the first communication network through the first base station.

* * * * *